US012154411B2

(12) United States Patent
Mosley et al.

(10) Patent No.: US 12,154,411 B2
(45) Date of Patent: Nov. 26, 2024

(54) SYSTEMS AND METHOD OF PLAYING A PROGRESSIVE GAME

(71) Applicant: Epic Tech, LLC, Suwanee, GA (US)

(72) Inventors: Bob Mosley, Piedmont, SC (US); Troy Jungmann, Leander, TX (US); Robert Weatherby, Flowery Branch, GA (US)

(73) Assignee: Epic Tech, LLC, Suwanee, GA (US)

( * ) Notice: Subject to any disclaimer, the term of this patent is extended or adjusted under 35 U.S.C. 154(b) by 0 days.

(21) Appl. No.: 18/204,622

(22) Filed: Jun. 1, 2023

(65) Prior Publication Data

US 2023/0316861 A1 Oct. 5, 2023

Related U.S. Application Data

(63) Continuation of application No. 17/149,708, filed on Jan. 14, 2021, now Pat. No. 11,704,969, which is a continuation of application No. 16/268,981, filed on Feb. 6, 2019, now Pat. No. 10,916,094, which is a continuation of application No. 15/887,156, filed on Feb. 2, 2018, now abandoned, which is a continuation of application No. 15/347,890, filed on Nov. 10, 2016, now abandoned, which is a continuation of application No. 15/134,747, filed on Apr. 21, 2016, now abandoned, which is a continuation of application No. 14/688,735, filed on Apr. 16, 2015, now abandoned, which is a continuation of application No. 14/056,680, filed on Oct. 17, 2013, now abandoned, which is a continuation of application No. 13/678,423, filed on Nov. 15, 2012, now Pat. No. 8,585,493.

(51) Int. Cl.
*G07F 17/32* (2006.01)

(52) U.S. Cl.
CPC ...... *G07F 17/3258* (2013.01); *G07F 17/3225* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 8,137,188 | B2 | 3/2012 | Breckner et al. |
| 8,535,145 | B2 | 9/2013 | Walker |
| 2004/0127277 | A1 | 7/2004 | Walker |
| 2006/0166731 | A1 | 7/2006 | Yoshimi |
| 2007/0156465 | A1 | 7/2007 | Walker |
| 2007/0218975 | A1 | 9/2007 | Iddings et al. |
| 2007/0218982 | A1 | 9/2007 | Baerlocher |
| 2008/0020831 | A1 | 1/2008 | Ikehara |

(Continued)

*Primary Examiner* — Ronald Laneau
(74) *Attorney, Agent, or Firm* — Baker Donelson; Carl M. Davis, II

(57) ABSTRACT

This disclosure describes systems, methods, and computer-readable media related playing a progressive game. In some embodiments, at least one request may be received from a player to play a first game associated with a first prize pool. Play of the first game may be facilitated on at least one networked terminal based at least in part on receiving the at least one request from the player to play the first game. Play of a second game associated with a second prize pool on the at least one networked terminal may be initiated. The second game may be initiated in response to the second prize pool reaching a predetermined amount.

18 Claims, 7 Drawing Sheets

(56) References Cited

U.S. PATENT DOCUMENTS

| | | | | |
|---|---|---|---|---|
| 2008/0108416 | A1 | 5/2008 | Inamura | |
| 2008/0171588 | A1 | 7/2008 | Atashband | |
| 2008/0254893 | A1 | 10/2008 | Patel | |
| 2009/0264203 | A1 | 10/2009 | Warkentin | |
| 2011/0124407 | A1 | 5/2011 | Finocchio | |
| 2013/0072294 | A1* | 3/2013 | Mosley | G07F 17/3225<br>463/42 |
| 2014/0135112 | A1* | 5/2014 | Mosley | G07F 17/3225<br>463/26 |
| 2016/0232753 | A1* | 8/2016 | Mosley | G07F 17/3258 |
| 2021/0174646 | A1* | 6/2021 | Mosley | G07F 17/3225 |

* cited by examiner

SYSTEMS AND METHOD OF PLAYING A PROGRESSIVE GAME

CROSS-REFERENCE TO RELATED APPLICATIONS

This application is a continuation of U.S. patent application Ser. No. 13/678,423, filed on Nov. 15, 2012, entitled "Systems and Methods of Playing a Progressive Game", which is incorporated by reference in its entirety herein.

BACKGROUND

Sweepstakes games allow a player to reveal a prize associated with a sweepstakes entry ticket. Electronic sweepstakes games allow a player to reveal the results of a ticket through a visually pleasing display on a computer or other gaming terminal. However, electronic sweepstakes games do not always keep the player engaged. The present system and methods recognize and address the forgoing considerations, and others, of prior art system and methods.

BRIEF SUMMARY

In one embodiment, a computer-implemented method may be provided. The method may include receiving, by one or more computer processors, at least one request from a player to play a first game associated with a first prize pool; facilitating, by the one or more computer processors, play of the first game on at least one networked terminal based at least in part on receiving the at least one request from the player to play the first game; and initiating, by the one or more computer processors, play of a second game associated with a second prize pool on the at least one networked terminal, wherein the second game is initiated in response to the second prize pool reaching a predetermined amount.

In one aspect of an embodiment, the method may include selecting, by the one or more computer processors, a start time associated with the second game.

In one aspect of an embodiment, the method may include determining, by the one or more computer processors, eligibility of the first player to play the second game. The eligibility is based at least in part on at least one of (a) submitting a first game play request within a predefined time period; (b) an average bet amount associated with the first player exceeding a predefined minimum; or (c) a minimum number of credits, points or money in an account associated with the first player.

In one aspect of an embodiment, the second game may be played concurrently with a play of the first game that occurs after a particular point in time. Play of the second game may terminate when either (i) a timer that begins to countdown at the particular point in time decrements to zero, or (ii) the second prize pool decrements to zero based on a plurality of prizes that are awarded during play of the second game.

In one aspect of an embodiment, a number of plays of the second game may be determined based at least in part on a number of prizes that are available to win during play of the second game.

In one aspect of an embodiment, a number of plays of the second game may be determined based at least in part on a total number of players that are eligible to play the second game at a pre-determined point in time.

In one aspect of an embodiment, an outcome of a play of the second game is independent of an outcome of a play of the first game.

In one embodiment, a computer-readable medium may store computer-executable instructions which, when executed by a processor, cause the processor to perform operations which may include receiving at least one request from a player to play a first game associated with a first prize pool; facilitating play of the first game on at least one networked terminal based at least in part on receiving the at least one request from the player to play the first game; and initiating play of a second game associated with a second prize pool on the at least one networked terminal, wherein the second game is initiated in response to the second prize pool reaching a predetermined amount.

In one aspect of an embodiment, the computer-executable instructions may further cause the processor to perform operations including selecting a start time associated with the second game.

In one aspect of an embodiment, the computer-executable instructions may further cause the processor to perform operations including determining eligibility of the first player to play the second game, wherein the eligibility is based at least in part on at least one of (a) submitting a first game play request within a predefined time period; (b) an average bet amount associated with the first player exceeding a predefined minimum; or (c) a minimum number of credits, points or money in an account associated with the first player.

In one aspect of an embodiment, the second game may be played concurrently with a play of the first game that occurs after a particular point in time. Play of the second game may terminate when either (i) a timer that begins to countdown at the particular point in time decrements to zero, or (ii) the second prize pool decrements to zero based on a plurality of prizes that are awarded during play of the second game.

In one aspect of an embodiment, a number of plays of the second game may be determined based at least in part on a number of prizes that are available to win during play of the second game.

In one aspect of an embodiment, a number of plays of the second game may be determined based at least in part on a total number of players that are eligible to play the second game at a pre-determined point in time.

In one aspect of an embodiment, an outcome of a play of the second game is independent of an outcome of a play of the first game.

In one embodiment, a system may include at least one memory storing computer-executable instructions; and at least one processor, wherein the at least one processor is configured to access the at least one memory and to execute the computer-executable instructions to receive at least one request from a player to play a first game associated with a first prize pool; facilitate play of the first game on at least one networked terminal based at least in part on a receipt of the at least one request from the player to play the first game; and initiate play of a second game associated with a second prize pool on the at least one networked terminal, wherein the second game is initiated in response to the second prize pool reaching a predetermined amount.

In one aspect of an embodiment, the at least one processor is further configured to execute the computer-executable instructions to select a start time associated with the second game.

In one aspect of an embodiment, the at least one processor is further configured to execute the computer-executable instructions to determine, eligibility of the first player to play the second game, wherein the eligibility is based at least in part on at least one of (a) submission of a first game play request within a predefined time period; (b) an average bet amount associated with the first player exceeding a pre-defined minimum; or (c) a minimum number of credits, points or money in an account associated with the first player.

In one aspect of an embodiment, the second game may be played concurrently with a play of the first game that occurs after a particular point in time. Play of the second game may terminate when either (i) a timer that begins to countdown at the particular point in time decrements to zero, or (ii) the second prize pool decrements to zero based on a plurality of prizes that are awarded during play of the second game.

In one aspect of an embodiment, a number of plays of the second game may be determined based at least in part on a number of prizes that are available to win during play of the second game.

In one aspect of an embodiment, a number of plays of the second game may be determined based at least in part on a total number of players that are eligible to play the second game at a pre-determined point in time.

In one aspect of an embodiment, an outcome of a play of the second game is independent of an outcome of a play of the first game.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
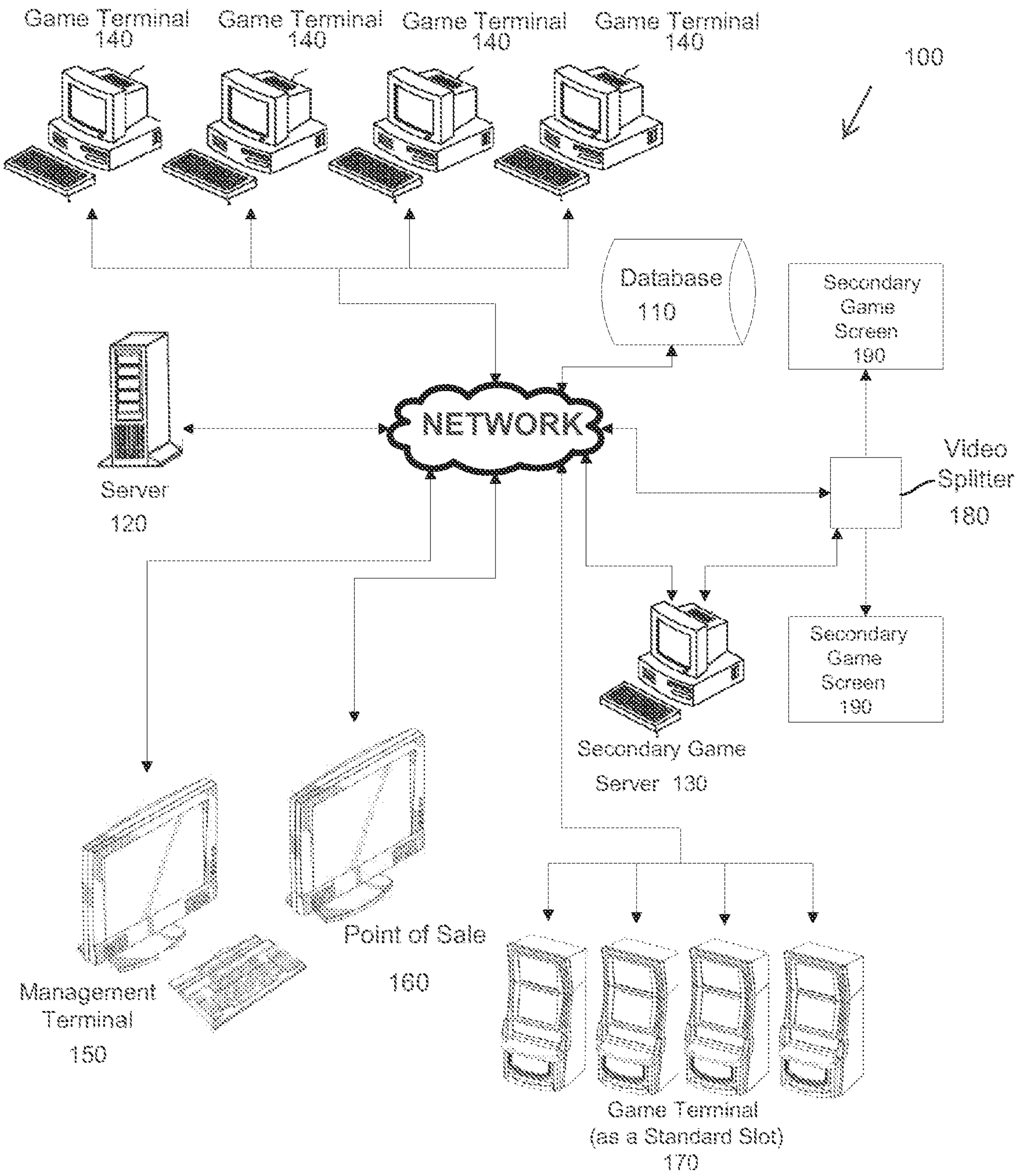
FIG. 1 is block diagram of an exemplary gaming system in accordance with one or more embodiments of the disclosure.

Reference will now be made in detail to presently preferred embodiments of the disclosure, one or more examples of which are illustrated in the accompanying drawings. Each example is provided by way of illustrative explanation and not a limitation of the disclosure. In fact, it will be apparent to those skilled in the art that modifications and variations can be made to the present disclosure without departing from the scope or spirit thereof. For instance, features illustrated or described as part of one embodiment may be used in another embodiment to yield a still further embodiment. Thus, the present disclosure covers such modifications and variations as come within the scope of the appended claims and their equivalents.

Embodiments of the present disclosure support electronic sweepstakes, electronic bingo games, casino games, and games structured for all gaming styles known in the art. For example, the present systems and methods can be used in connection with, but are not limited to, random number generated ("RNG") games, electronic pull tab games, electronic slot games, electronic bingo games, electronic lottery-based games, and any other gaming systems known in the art. These types of games are well known. Embodiments of the disclosure are agnostic to the methods in which the results are delivered. In some embodiments, the present systems and methods can be used in connection with any and all Class II and III games.

In various embodiments, the present systems and methods can be used in connection with electronic sweepstakes games. Generally speaking, electronic sweepstakes, also known as electronic game promotions, operate in brick-and-mortar "Internet cafés," also called "cybercafés." Internet cafés are businesses that provide Internet access (and/or some other product) to the public, usually for a fee. These businesses may also provide snacks and drinks for a fee, hence the "café" aspect of the name. In some embodiments, a customer enters an Internet café and purchases a long-distance calling card, Internet time, business center services, a rebate coupon, or other products or services. In conjunction, the customer receives a number of sweepstakes entries or game promotion entries. The number of sweepstakes entries may, but need not, correspond to the number of products purchased. For example, a customer purchasing $10 of Internet time may receive 1,000 entries into the sweepstakes.

In various embodiments, at the time of purchase, a central computer server at the Internet café randomly selects one or more sweepstakes entries for the customer from a predetermined, finite pool of entries. In other embodiments, the sweepstakes tickets are randomly selected by the server when the customer accesses a computer terminal and directs the machine to do so. The sweepstakes entries are then typically assigned to a unique account associated with that customer. After purchase, the customer may be provided with a receipt, an electronic or magnetic card, or a ticket that contains or displays a personal identification number ("PIN") or other code unique to the customer's account. In various embodiments, the customer may then use that PIN, card, or ticket to access the Internet, redeem rebates, utilize business center services, and/or reveal his sweepstakes entries. Logistically speaking, a customer would typically approach a computer terminal, swipe his card or input his PIN, and be logged into the system.

If the customer elects to reveal sweepstakes entries, the customer may have the option to immediately reveal the sweepstakes results all at once. In other embodiments, the customer may utilize an entertaining display to reveal the results of the sweepstakes tickets one by one. In some embodiments where the sweepstakes tickets are randomly selected by the server, the customer may select a particular game and bet level and direct the system to proceed. In various embodiments, the system server will then randomly select a sweepstakes ticket and reveal it to the customer.

In various embodiments, the entertaining display may be designed to mimic slot machine reels, a bingo game, a keno game, a poker game, or a similar casino-style game. The games are considered "simulated games" because the games themselves have no impact on the outcome of the sweepstakes. That is to say, the games are interactive, but the interaction has no impact on whether the player wins or loses. Even games that appear to be skill-based are not. The sweepstakes entries received by the customer are already predetermined as winners or losers—the customer merely uses the game as an entertaining way to reveal that result.

The electronic sweepstakes itself operates in the same manner as a standard, non-electronic sweepstakes. The sweepstakes software program creates a finite set of sweepstakes entries and a finite set of prizes. The value of all prizes is predetermined and assigned to a specific sweepstakes entry before the sweepstakes begins. No function of the software or action by the customer can change the content of any sweepstakes entry once it has been created and assigned a prize. The sweepstakes software program randomly selects the sweepstakes entries to be distributed each time a customer initiates a purchase or otherwise directs the server to do so. The electronic sweepstakes does not require a purchase and typically has an alternate "no purchase necessary" method of entry which has the same odds of winning as the purchase-based entries, as they are all randomly drawn from the same pool. The electronic sweepstakes may also be limited in time.

The present system and methods also supports progressive type systems. Progressive systems, in this context, involve a group of gaming terminals linked together by a network. An amount or percentage of a bet, points, credits, money, etc. used to play a first game is contributed to a progressive pot each time an individual reveals a sweepstakes entry. In some embodiments, the sweepstakes entries could be revealed by spin, play, or reveal. Thus, as individuals continue to play the game or reveal sweepstakes entries, the progressive pot grows.

In the sweepstakes context, a participant may purchase a number of sweepstakes tickets. The participant may be provided a set of points that may be deducted at a particular rate for each sweepstakes ticket that is redeemed. For example, each sweepstakes ticket that is revealed may be worth 30 point and, thus, 30 points will be deducted from the point total for each ticket that is revealed. In various embodiments, a portion of the participant's points (e.g., two additional points) may also be contributed to a progressive pot.

Overview

In various embodiments, a plurality of networked gaming terminals that are operatively coupled to a server is provided that allows one or more players on the plurality of terminals to play a first game, contribute (e.g., pay a wager) to a progressive type game (e.g., a second game), and simultaneously play the second game with the first game if play of the second game is triggered while the one or more players are each playing the first game. Each play on one of the networked terminals contributes a portion of the wager of the play (e.g., money, points or credits) to the second game prize pot. Once the second game prize pot exceeds a predetermined level, the system schedules play of the second game at a particular point in time in the future. For example, the system may be configured to schedule play of the second game once the second game prize pot exceeds $5,000, 5000 points or 5000 credits.

Scheduling play of the second game, in various embodiments, involves the system choosing the particular point in time in the future when play of the second game should trigger. In some embodiments, the particular point in time may be randomly chosen. In some of these embodiments, the particular point in time may be a randomly chosen day and time, where the time is chosen between an upper and a lower predetermined time limit (e.g., between 3 PM-12 AM, Friday-Sunday). In this way, the randomly chosen particular point in time can be selected during hours when players are most likely to be logged into the system and playing the first game.

The system determines which players are eligible to play the second game when play of the second game is triggered. There are several ways the system can determine eligibility. In various embodiments, players who are playing the first game at the particular point in time when the second game is triggered to play are considered to be eligible players to play the second game. In other embodiments, a player may be considered to be eligible to play the second game if (1) they are playing the first game when the second game is triggered; and (2) the player satisfies at least one criterion at the time play of the second game is triggered. In various embodiments, the criterion may be one or more of: (1) submitting a first game play request within a predefined time period; (2) having an average bet amount that exceeds a predefined minimum; (3) having a minimum number of credits, point or money in the player's account on the gaming system when play of the second game triggers; or (4) any other suitable criterion based on the configuration of the gaming system for distinguishing eligible players from non-eligible players.

In various embodiments, play of the second game occurs simultaneous with an eligible player's play of the first game. For example, in the context of a sweepstakes, each time the player at the gaming terminal selects reveal or spin in the first sweepstakes game at the gaming terminal, a corresponding reveal or spin of a draw occurs for the second sweepstakes game. In this way, play of the second game does not require the player to perform any additional acts other than to keep playing the first game. In various embodiments, the player can play the second game so long as they have sufficient credits to play the first game during the time the second game is being played.

In various embodiments, play of the second game, once triggered, will continue until the first of a timer or the second game prize pot decrements to zero. For example, in some embodiments, the second game is configured to display a timer and the second game prize pot amount to the players at the gaming terminals. As the eligible players play the first game, and simultaneously play the second game, the timer and the second game pot amount decrement until one of the two reaches zero (e.g., the timer counts down to zero and the amount of each prize won by a player is decremented from the second game prize pot until the pot reaches zero). At this point, the second game ends. In further embodiments, if the aforementioned timer reaches zero before the second game prize pot reaches zero, then the remainder of second game prize pot rolls over into the next progressive second game prize pot to be played at a different time.

In various embodiments, more than one progressive game may be configured to play. For example, the player makes a wager (e.g., money, points or credits) when playing the first game. A percentage (or fixed portion) of the player's wager for the first game may be directed to a progressive prize pot for one or more progressive games. For example, if a player wagers $0.25 to play the first game, 10% or $0.025 of this fee may be used toward one or more progressive games. In some embodiments, 50% of the $0.025 or $0.0125 (or some number of points) can be taken to aggregate toward a first progressive prize pot, and the other 50% of the money or points toward a second progressive prize pot. In this way, more than one progressive game may be simultaneously scheduled to play at different particular points in time. It should be understood from reference to this disclosure that instead of diverting a percentage of the player's wager to the progressive prize pot, the system may be configured to charge the player additional money, points or credits (e.g. a fee) toward the one or more progressive pots as at least one condition to be eligible to win if one or more of the progressive games trigger to play during the time the player is playing the first game.

In some embodiments, any of the aforementioned first game and progressive games may be combined with a community game. A community game is more specifically described in U.S. patent Ser. No. 13/617,105, entitled "Gaming System and Method", which is incorporated in its entirety herein by reference.

Exemplary Technical Platforms

As will be appreciated by one skilled in the relevant field, the present disclosure may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus to produce a machine. As such, the instructions which execute on the general purpose computer, special purpose computer, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including: a local area network (LAN); a wide area network (WAN); or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer, or other programmable apparatus, to produce a computer implemented process. The computer program instructions that that are loaded on the computer or other programmable apparatus execute to provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary Gaming System

FIG. 1 illustrates a system 100 for providing a game in accordance with an embodiment of the present disclosure. The system 100 comprises a database 110, a server 120, at least one secondary game server 130, one or more game terminals (that may be PC-based) 140, a management terminal 150, a point-of-sale ("POS") device 160, one or more standalone game terminals (that may be any gaming based machine) 170, a video splitter 180, a relatively large monitor or television (secondary game screen) 190, or any combination thereof. Those skilled in the art with reference to this disclosure should appreciate that other configurations may be used to accomplish the methods described herein without departing from the scope of the present disclosure. For example, in various embodiments, the server 120 may be configured to also provide the functionality provided by the secondary game server 130.

It should be understood that each of the computing devices, including the server 120, the secondary game server 130, the one or more game terminals 140, the management terminal 150, the POS device 160, and the one or more standalone game terminals 170, may each have a computer hardware processor, input and output devices (for example, a computer monitor, a keyboard, selection buttons, and/or mouse) and at least one storage device (for example, memory, hard drives, etc.). These devices may also have network connection cards to connect to the network. At least some of these devices may also include a computer readable medium, which is further described herein.

The alternate community game may run asynchronously with an integrated gaming system or as a linked product via SAS to other gaming terminals, In certain embodiments, the alternate community game is not intended to be a standalone gaming platform because it is initiated based upon play of the game play on each gaming terminal connected to the gaming system 100. There are specific integration points between the game server, gaming terminals, and the secondary game server that allows one or more players to participate in playing a game at a terminal while earning eligibility to win a community game prize.

The server 120 and a secondary game server 130 are configured to communicate data from various devices in the system and to perform one or more method steps, as detailed below. The database 110 may contain various types of data and computer instructions for performing at least some of the steps presented herein. Although a single server is indicated for the server 120, and a single database for the database 110, it should be understood that the network may be comprised of multiple servers and databases, whether located locally and networked through a local area network or remotely through a wide area network or an internet connection. Thus, the single representations at 120 and 110 are provided for purposes of illustration and clarity only and should be understood to represent such other configurations.

The gaming terminals 140 and 170 are illustrated as linked together via a network (which may be via the network shown in FIG. 1 or any additional network). Each gaming terminal may be a standard standalone gaming machine 170, a personal computer (PC) 140 or other computing device (not shown). The gaming terminals 140 and 170 are illustrated in FIG. 1 as separate groups (even though they function similarly and perform the same method steps).

The POS device 160 allows players to buy internet time or another product or service. Play of the gaming terminals could be free with such purchases. In various embodiments, the player may use the POS device 160 to directly load an account card with credits to play games on the gaming terminals. This account card is associated with an account that the player may use to play the game on a game terminal 140, 170 and earn eligibility to win prizes when a community game is triggered.

The management terminal 150 may be a device that is operatively connected with the server 120 or secondary game server 130 to initiate, enable, disable or change a community game. Other managerial or supervisory operations may also be performed using the management terminal 160.

The secondary game server 130 controls one or more operations of the alternate community game, such as determining results for the alternate community game, displaying the alternate community game results, and/or any other operations as discussed herein. In some embodiments, the secondary game server 130 is part of the server 120 such that the server 120 performs all or part of the operations of the secondary game server 130.

A video splitter 180 may be operatively connected to the secondary game server 130 and/or the network. The video splitter may be used to split any received video feed to secondary game screens 190. The secondary game screens 190 may be television screens, monitors, or other devices that are capable of displaying a community game board and other procedures of a community game.

One or more of the devices illustrated in FIG. 1 may be connected to a network as previously mentioned. In one embodiment, all devices in FIG. 1 are connected to the network and communicate with each other over the network. It should be noted that the network in FIG. 1 need not be a single network (such as only the internet) and may be multiple networks (whether connected to each other or not). In another embodiment, the network may be a local area network ("LAN") and a wide area network ("WAN") (e.g., the internet) such that one or more devices (for example, server 120, secondary game server 130, management terminal 150 and database 110) are connected together via the LAN, and the LAN is connected to the WAN which in turn is connected to other devices (for example, the game terminals 140, 170). The terms "linked together" or "connected together" refers to devices having a common network connection via a network (either directly on a network or indirectly through multiple networks), such as one or more devices on the same LAN, WAN or some network combination thereof.

It should be understood that FIG. 1 is an exemplary embodiment of the present system and various other configurations are within the scope of the present system. Additionally, it should be understood that additional devices may be included in the system shown in FIG. 1, or in other embodiments, certain devices may perform the operation of other devices shown in the figure.

Figure 2:
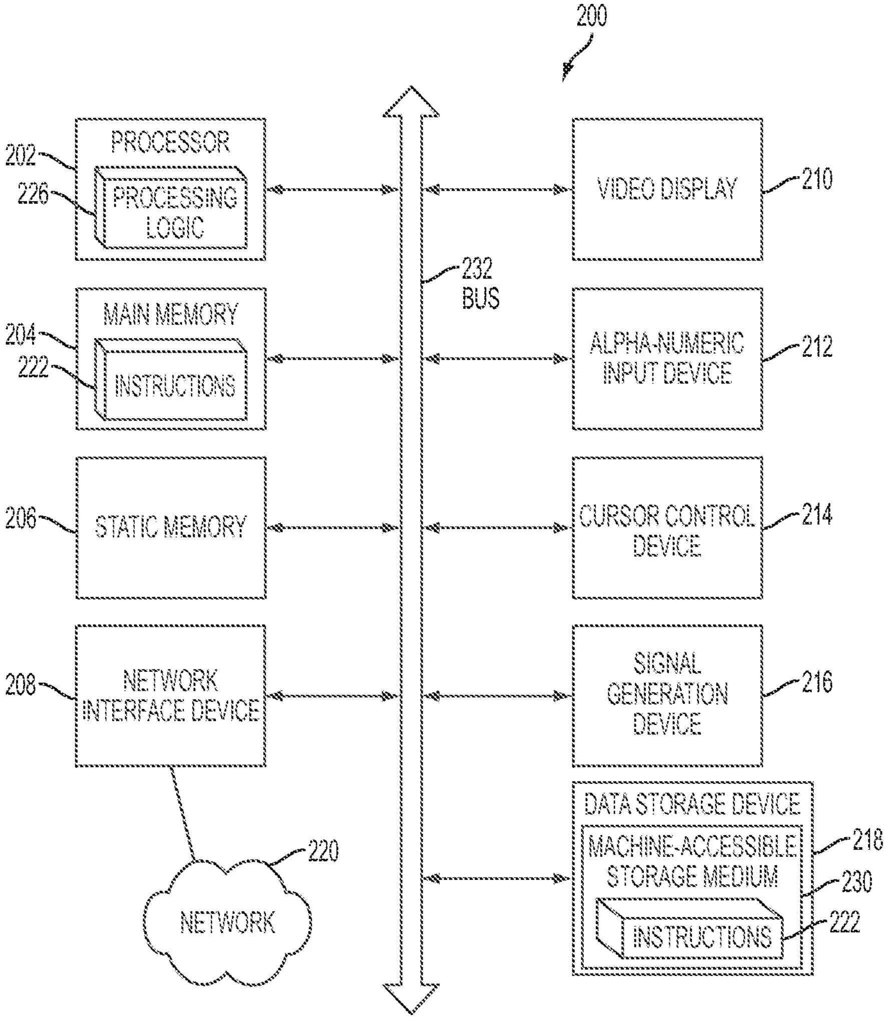
FIG. 2 is a block diagram of a computer that may be used, for example, as a gaming terminal or server computer within the context of system of FIG. 1, in accordance with one or more embodiments of the disclosure.

FIG. 2 illustrates a diagrammatic representation of a computer architecture 200 that can be used within the file management system 100, for example, as a client computer (e.g., one of the client computers 102, 104, 106 shown in FIG. 1), or as a server computer (e.g., the file management server 112 shown in FIG. 1). For purposes of this disclosure, reference to a server or processor, shall be interpreted to include: a single server, a single processor; multiple servers; multiple processors; or any combination of servers and processors.

In particular embodiments, the computer implemented by architecture 200 may be connected (e.g., networked) to other computers by a LAN, an intranet, an extranet, and/or the Internet. The computer may operate in the capacity of a server or a client computer in a client-server network environment, or as a peer computer in a peer-to-peer (or distributed) network environment. The computer may be a personal computer (PC) 104, a tablet PC 102, a handheld device 106, a set-top box (STB), a Personal Digital Assistant (PDA), a web appliance, a server 112, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

The exemplary computer architecture 200 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processor 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, a processor implementing other instruction sets, or processors implementing a combination of instruction sets. The processor 202 may also be one or more special-purpose processing devices such as an application specific integrated circuit (ASIC), a field programmable gate array (FPGA), a digital signal processor (DSP), a network processor, or the like. The processor 202 may be configured to execute the processing logic 226 for performing various operations and steps discussed herein.

The computer architecture 200 may further include a network interface device 208. The computer architecture 200 also may include a video display 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a machine accessible storage medium 230 (also known as a non-transitory computer-accessible storage medium, a non-transitory computer-readable storage medium, or a non-transitory computer-readable medium) on which is stored one or more sets of instructions embodying any one or more of the methodologies or functions described herein (e.g., a game module 300). The game module 300 may also reside, completely or at least partially, within the main memory 204 and/or within the processing device 202 during execution thereof by the computer 200. The main memory 204 and the processing device 202 also constitute computer-accessible storage media. The instructions 222 may further be transmitted or received over a network 220 via the network interface device 208.

While the machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present disclosure. The term "computer-accessible storage medium" shall accordingly be understood to include, but not be limited to, solid-state memories, optical, and magnetic media.

Exemplary Gaming Methods

Figure 3:
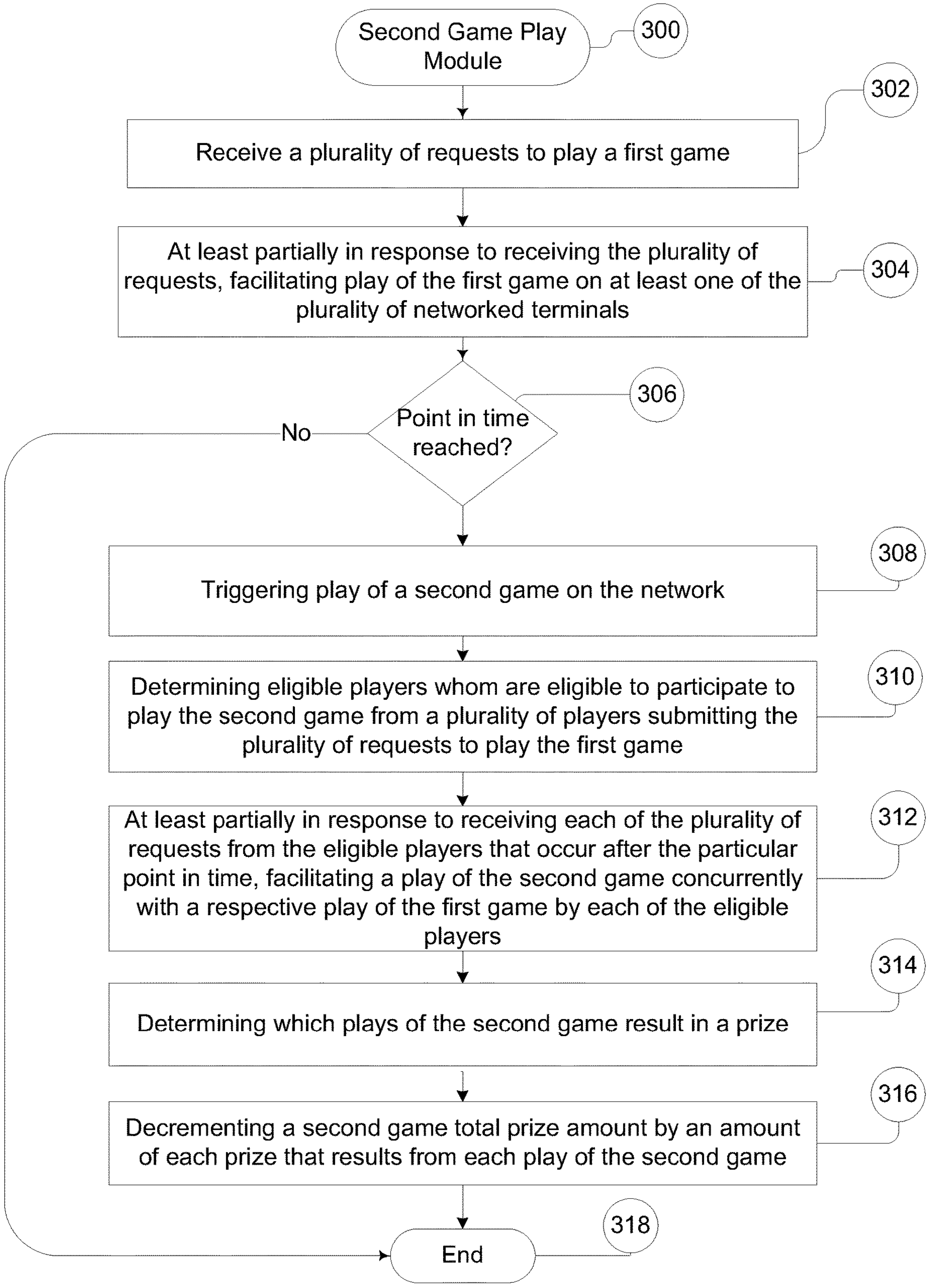
FIG. 3 comprises a flow diagram illustrating an exemplary process performed by the system of FIG. 1 in accordance with one or more embodiments of the disclosure.

FIG. 3 depicts an exemplary method for playing a first game and a second community game on a gaming terminal. The gaming terminals 140, 170, server 120, and secondary game server 130 may alone, or in combination, perform the method steps described in the module of FIG. 3. It should be understood by reference to this disclosure that these methods describe exemplary embodiments of the method steps carried out by the present system, and that other exemplary embodiments may be created by adding other steps or by removing one or more of the methods steps described in FIG. 3.

The game module of FIG. 3 allows a player to play a first game, and if a second game is triggered during play of the first game, the player simultaneously plays the second game for each respective play of the first game. The process begins at step 302, when the system 100 receives a plurality of requests from one or more players to play a game, for example, at gaming terminals 140, 170. At least partially in response to receiving the plurality of requests, at step 304, the system 100 facilitates play of the first game on at least one of the plurality of game terminals. The system may facilitate play of the game based solely on receiving the request or based on one or more of (a) receiving a request to play; (2) receiving a fee for the play; (3) verifying that the player is logged into a valid account; (4) contributing a certain amount of credits or points for the play; or (5) any other suitable criterion that must be satisfied prior to facilitating a play of the game.

At step 306, the system 100 checks to see if a particular point in time has been reached. If not, normal play of the first game continues on each of the gaming terminals. If, on the other hand, the particular point in time has been reached, the system, at step 308, triggers play of the second game. At step 310, the system determines which of the players, from the plurality of players playing the first game, are eligible to play the second game. In various embodiments, all of the players playing the first game when the second game is triggered to play are considered to be eligible to play the second game. In various embodiments, players playing the first game when the second game triggers to play and who satisfy a first criterion will be eligible to participate in the second game. In various embodiments, the first criterion may be submitting a request to play the first game within a specified time period. In other embodiments, the first criterion may be based on the player's average bet size for that day's play in which the second game triggers to play. In still other embodiments, the first criterion may be maintaining an average bet size for all play over a specified period of time (e.g., the prior week, the prior month or the life of the player's account). In any case, the system must determine which of the players from the plurality of players playing the first game are eligible to participate in the second game.

At step 312, at least partially in response to receiving requests from the eligible players, where the requests occur after the particular point in time, the system facilitates a play of the second game concurrently with a respective play of the first game by each of the eligible players that submit a request. At step 314, the system determines which plays of the second game result in a prize. At step 316, the system decrements a second game prize pot amount by an amount of each prize that results from each play of the second game.

In various embodiments, the system, when play of the second game begins, starts a timer 550 that is displayed along with the second game prize pot amount 552 to all of the players. In some embodiments, the system 100 displays the timer and the second game prize pot amount on the secondary game display 190, which, in various embodiments, is a large community display that can be viewed by all players. The displayed time 550 and second game prize pot amount 552 provides the player with an indication of the time remaining for the player to play the second game and the amount of the prize pot that can still be won form play of the second game. In some embodiments, the second game may terminate when: (1) the second game total prize amount is decremented to zero; or (2) the displayed timer is decremented to zero. In other embodiments, the timer and second game prize pool amount may be displayed on each networked gaming terminal so that the player does not need to look away from the gaming terminal to determine how much time is left on the timer and how much prize money is still remaining to be won by play of the second game.

In various embodiments the second game is a sweepstakes game. In these embodiments, the system may determine an estimated total number of entries that will allow the game to play for the allotted time. In some embodiments, when the second game is scheduled to play at the particular point in time, the system randomly chooses the second game prize payout from one or more prize payout schedules. For example, assuming the total prize pool is $5,000, the system may randomly choose one of four potential prize payout schedules to assign to the play of the scheduled second game. The four prize distributions may be as follows:

| Prize Payout Schedule Number | Prize Payout Distribution Schedule |
|---|---|
| 1 | 1 - $1,000 prize<br>6 - $250 prizes<br>25 - $100 prizes |
| 2 | 2 - $1,000 prizes<br>8 - $200 prizes<br>10 - $100 prizes<br>40 - $10 prizes |
| 3 | 6 - $500 prizes<br>5 - $200 prizes<br>10 - $100 prizes |
| 4 | 6 - $250 prizes<br>20 - $100 prizes<br>10 - $100 prizes<br>50 - $10 prizes |

Continuing with the example, the system may also randomly choose from among several choices on how long the game will play. Thus, the system will determine, at the time the second game is triggered to play, an estimated total number of sweepstakes tickets that should be used for play of the second game.

In various embodiments, the system calculates the estimated total number of tickets based on or more of: (1) the randomly selected prize payout schedule; (2) the total number of eligible players playing the game at the time the second game is triggered; (3) the randomly selected time the second game will play; and (4) and the average time it takes a player to play one play of the first game. It should be understood by those skilled in the art with reference to this disclosure that the total number of tickets for the second game may also be based on other suitable factors that would affect the length of play of the second game. Thus, once the system determines the estimated total number of draws that will allow the second game to be substantially played for the required length of time, the system will create two types of tickets. First, the system creates tickets for the prizes from the selected prize payout schedule. Next, the system creates enough losing tickets so that the combination of losing tickets and winning tickets equals the estimated total number of draws necessary to play the game. In this way, the system generates an estimated number of sweepstakes tickets that will allow the game to play for the allotted amount of time.

In various embodiments, the timer may decrement to zero before all prizes for the second game are won by the eligible players. This may happen for many reasons, such as (1) the number of eligible players playing the game may taper off as the eligible players run out of credits to play the first game; or (2) the eligible players submit requests to play the first game at a slower rate than the average rate used to calculate the estimated total number of tickets. In some embodiments, if the timer decrements to zero before the prize pool is depleted, the remainder of the second game prize pool is rolled over to the next second game prize pool, which, in turn, may shorten the time when the next second game is scheduled to play Exemplary User Experience The operation of exemplary embodiments of the first game and the second game are perhaps best understood by reviewing particular examples. The following examples describe the experience of the player while playing the first game and the second game (i.e., the progressive game). In the examples described herein, the game on terminal 140, 170 and the second game are sweepstakes games. However, it should be understood that the methods and systems described herein also apply to other types of games such as Class II and/or Class III games, including standalone game terminals.

User Experience at a Game Terminal

Figure 4:
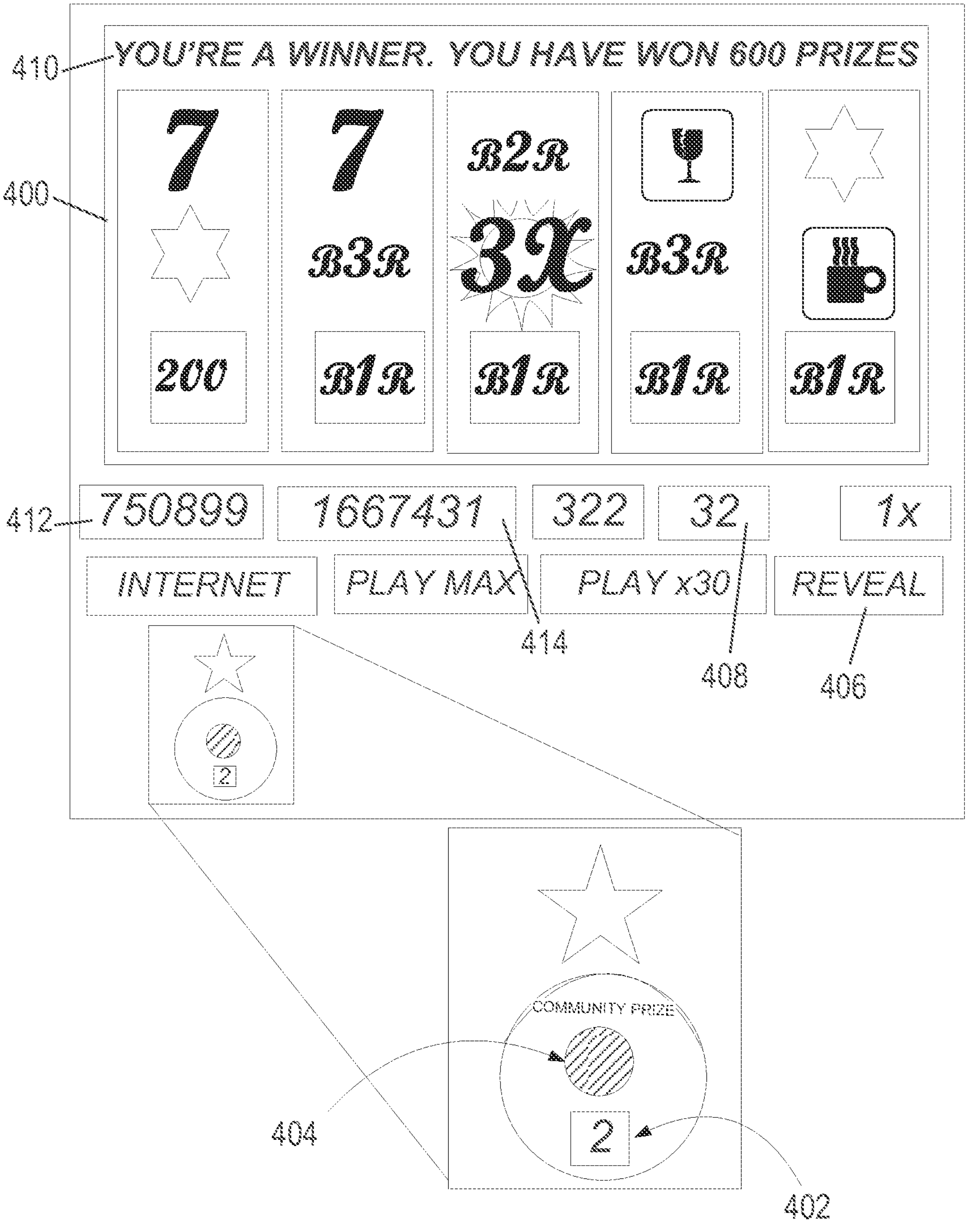
FIG. 4 comprises the contents of a graphical user interface in accordance with one or more embodiments of the disclosure.

Referring to FIG. 4, a player logs into a game terminal 140, 170 (FIG. 1) by entering a pin number, swiping a player magnetically-encoded card, inserting cash to a bill acceptor on a standalone game terminal or by any other suitable method to activate or associate some account or player with the game terminal 140, 170. The game terminals 140, 170 accesses database 110 (FIG. 1) to determine if there are any credits or fees required to play the game, and if so, displays the credits or fees at 408. The player manually initiates the first game by activating the appropriate button (e.g., the "Reveal" button or other button) 406. The initiation request (including any participation credits or contribution fees) is transmitted to server 120 (FIG. 1) for processing. If required, the fees or credits are transferred from the account of the player (whether the account is a cash account on the game terminal or an account associated with the user's entered card) to the server 120 in order to play the game.

In various embodiments, when the player presses the reveal button 406, the game terminal 140, 170 sends a request to the server 120. The server 120 pulls a sweepstakes draw from a fixed number of electronic sweepstake draws and returns a result of the ticket to the game terminal 140, 170. The game terminal 140, 170 evaluates the received result and initiates a reel spin to display a combination of symbols on screen 400 that corresponds to the result received from the server 120. In various embodiments, one or more symbol combinations for each prize result is stored in the database 110, or in local memory in terminals 140, 170, and the game terminal 140, 170: (1) retrieves a symbol combination for the prize, (2) assigns a symbol to each respective reel and (3) stops the reels from left to right, one at a time, until one symbol is displayed for each of the reels.

In various embodiments, multiple combinations of real positions are assigned to each prize level. Thus, the game terminal 140, 170 may randomly choose from among the multiple combinations of real positions for any one prize level to present the player with varying displays for each prize. In this way, the display associated with any one prize level changes from play to play to make game play more interesting to the player. The system 100 provides an indication 410 of the winnings for the current spin and increments the user's sweepstakes points 412 by the awarded prize. The display 400 may also include a "total prizes" counter 414 that provides the player with an indication of the total prizes won by that player. Play continues in response to additional requests until all of the tickets for the sweepstakes have been depleted. Once the sweepstakes ends, a new sweepstakes game begins.

User Experience for the Second Game

Figure 5A:
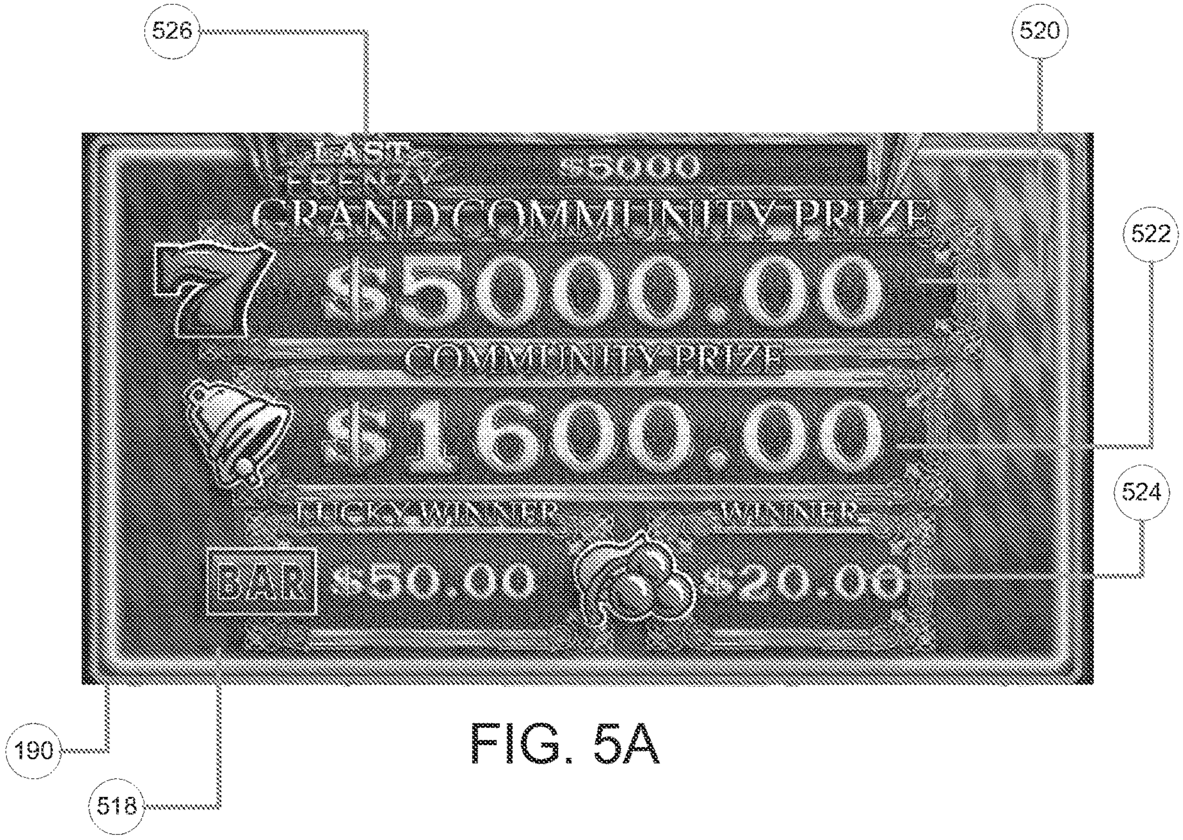
FIGS. 5A-5E illustrate graphical user interfaces for the gaming system of FIG. 1 in accordance with one or more embodiments of the disclosure.

Referring to FIG. 5A, the secondary display 190 is shown displaying an attract message that the players see when they enter the gaming area. The attract message can be used to indicate to potential players that the game terminals 140, 170 are part of a progressive game system. The secondary display 190 is shown displaying prize structure 518 for one progressive game. In various embodiments, the community game may have a prize structure that includes a top level shared prize 520, an intermediate level shared prize 522 and a low level individual prize 524. It should also be understood from reference to this disclosure that the number of prize levels for the community game can vary. Thus, in some embodiments, the community game may have four prize levels—a top level shared prize, a top level intermediate shared prize, a low level intermediate individual prize and a low level individual prize. The top level prize 520 and the intermediate level prize 522 may be progressive type prizes where the prizes start at predetermined level and increase as players play games on the individual game terminals 140, 170.

Figure 5B:

A second progressive game 526, as described herein, is also included on the secondary display 190. When secondary display 190 is in the attract mode, it displays the amount of the last prize pool for the second progressive game. At some point during play of the first game, play of the second game (e.g., progressive) may trigger. Referring to FIG. 5B, the secondary display screen 190 displays a message 528 that play of the second progressive game is about to being. As indicated above, play of the second game, in various embodiments, triggers when a particular point in time is reached. In some embodiments, play of the second game occurs on secondary game server 130, and the results are displayed on the secondary game screen 190, which is viewable by all participants.

Figure 5C:
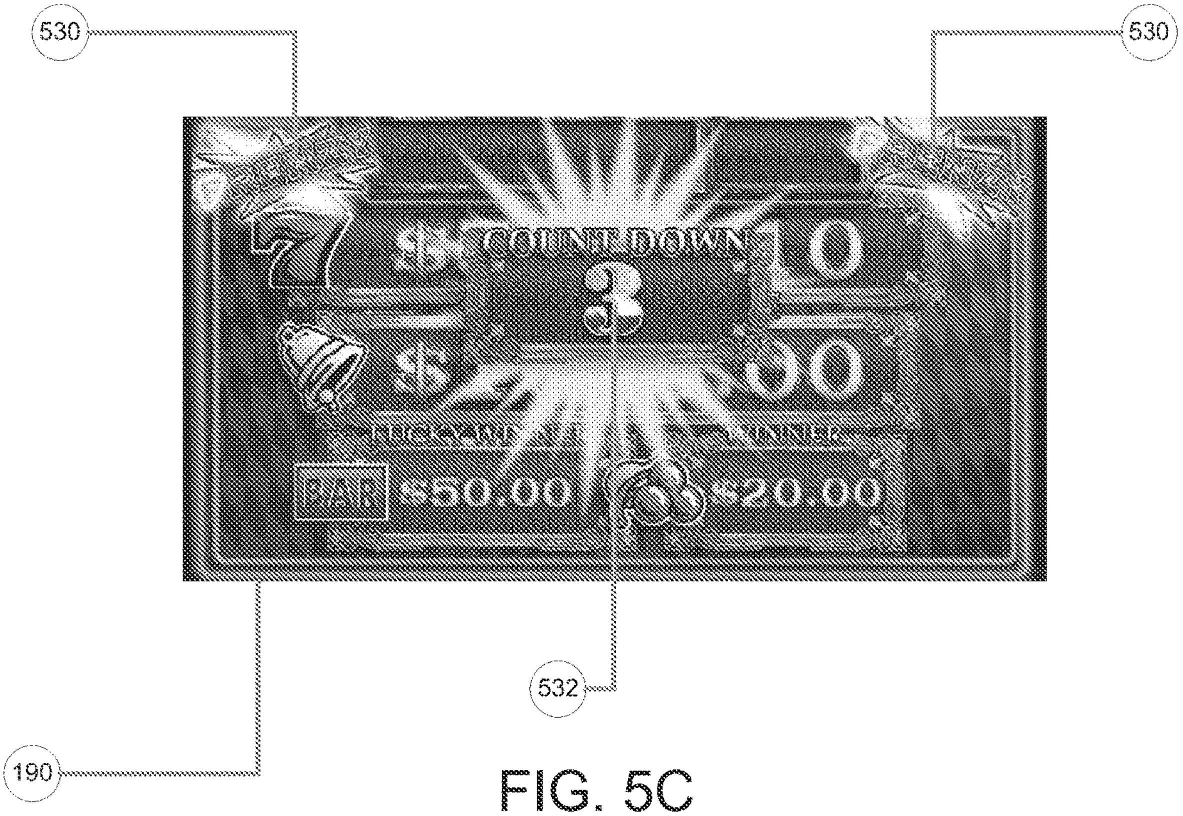

Referring to FIG. 5C, the secondary game screen 190 displays a countdown message 532 that informs players that play of the second progressive game is about to begin. In various embodiments, the system may play music or other sounds in addition to displaying the countdown message 532. In addition to the countdown timer 532, the logos 530 of the second progressive game may also be displayed so the player knows which of one or more progressive games is being played. Once the countdown message 532 decrements to zero, the play of the second progressive game begins.

Figure 5D:
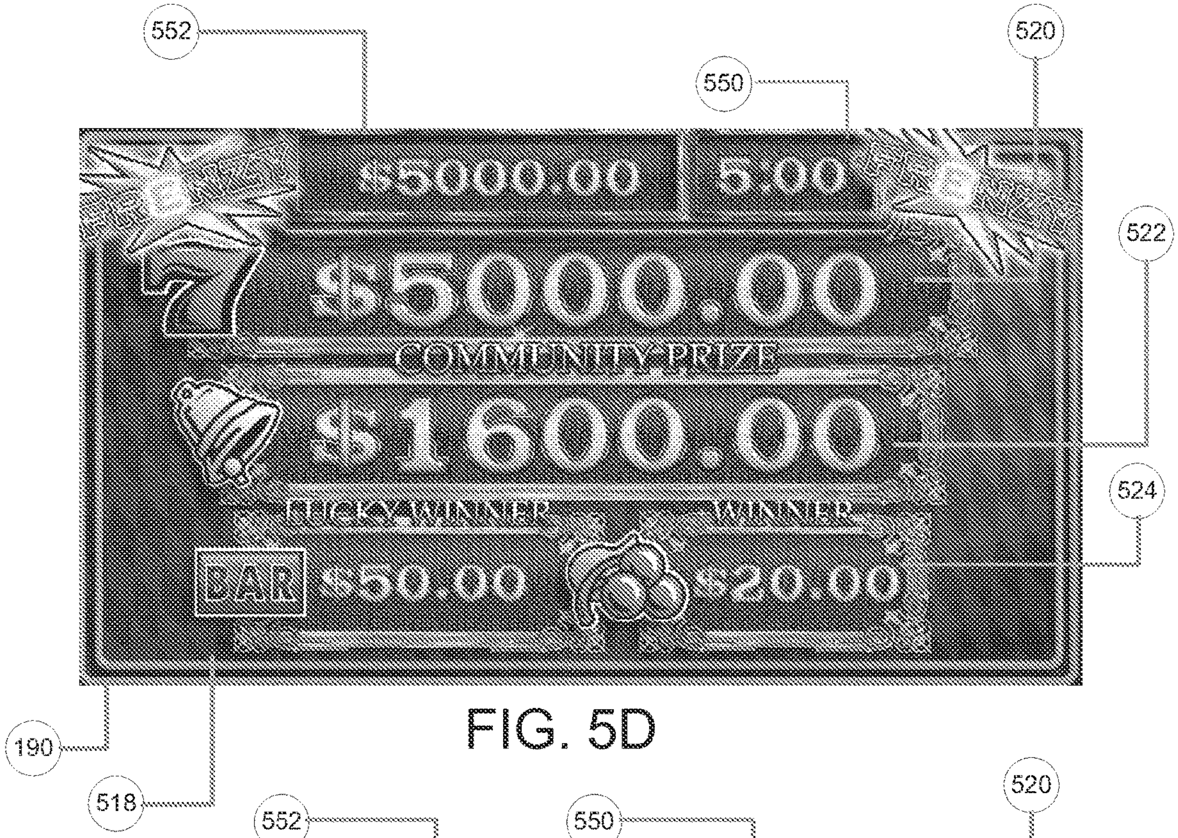

Referring to FIG. 5D, a prize pool amount 552 and countdown timer 550 are displayed at the top of the secondary display 190. The prize pool amount 552 indicates the total amount that will be awarded in the second game and the countdown timer indicates the length of time that the second game will play. Thus, each time an eligible player plays the first game, they concurrently receive a draw to win a prize from the second game. For example, when a player hits the reveal button 306, as described above with regard to FIG. 4, the system selects a sweepstakes draw from a finite number of draws for the first game. Additionally, a separate sweepstakes draw is selected from a finite number of draws for the second progressive game for each respective play of the first game by an eligible player.

Figure 5E:
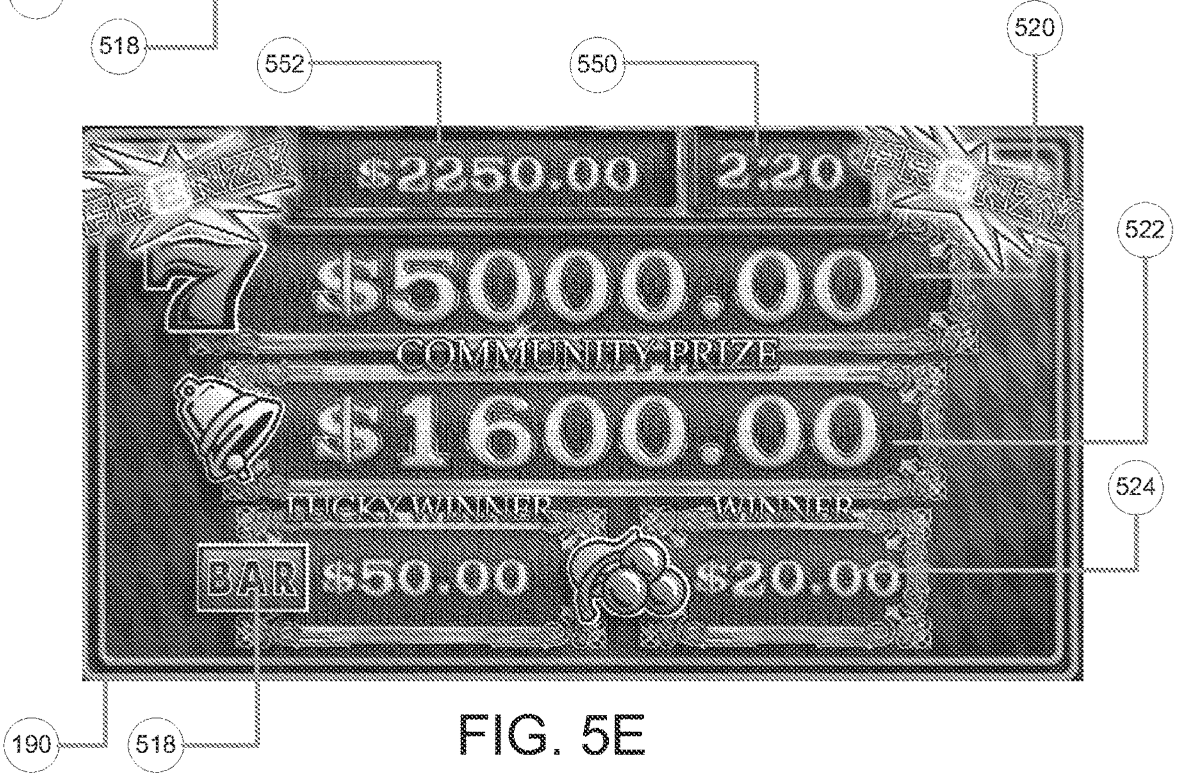

Referring to FIG. 5E, the second game server determines if the sweepstakes draw for the second progressive game results in a prize and decrements the displayed prize pool amount 552 by the amount of each prize associated with a winning draw. The countdown timer 550 continues to decrement by time increments (e.g., seconds) while the second progressive game is being played. When either the timer 550 or the second game prize pool amount decrements to zero, play of the second game ends. In various embodiments, music may be played during play of the second progressive game to provide an audio indication that the game is being played. In this way, a player does not need to look at the secondary display 190 to determine if the second progressive game is still being played.

In various embodiments, system 100 awards prizes in money. In other embodiments, the prizes may be awarded in the form of points, internet time, gaming play credits or products. In alternate embodiments, the award of prizes may be carried out by a cashless implementation or directly by the game terminals 140, 170. For example, if a player wins a prize, the game terminal of that player may receive a monetary credit or the player's account may increase by the prize amount. Moreover, in various embodiments, transactions associated with prize awards may be stored in database 110 for later reference.

In the embodiments described herein, the games played on the game terminal 140, 170 and the second progressive game are in the form of an electronic slot machine with reels. In alternate embodiments, the games played may include bingo, lottery, Keno or poker. In various embodiments, the game terminal may have a plurality of games that a player may choose from when the player logs into the terminal as a means of visually displaying the results of a winning play.

What is claimed is:

1. A computer-implemented method comprising:

receiving, by one or more computer processors, at least one request with a wager from a player to play a first game associated with a first prize pool;

facilitating, by the one or more computer processors, play of the first game on at least one networked terminal based at least in part on receiving the at least one request from the player to play the first game;

directing a portion of said wager to a second prize pool; and initiating, by the one or more computer processors, play of a second game associated with the second prize pool on the at least one networked terminal, wherein the second game is initiated in response to the second prize pool reaching a predetermined amount, and said player eligible to play said second game based on an eligibility criteria, wherein a number of plays of the second game is determined based at least in part on a total number of players that are eligible to play the second game at a predetermined point in time.

2. The computer-implemented method of claim 1, further-comprising the step of selecting, by the one or more computer processors, a start time associated with the second game after the second prize pool reaches the predetermined amount.

3. The computer-implemented method of claim 1, wherein the eligibility criteria is based at least in part on at least one of:

(a) submitting a first game play request by the player within a first predefined time period;

(b) an average bet amount associated with the first player exceeding a predefined minimum during a second predetermined time period; or (c) a minimum number of credits, points or money in an account associated with the player.

4. The computer-implemented method of claim 1, wherein the second game is played concurrently with play of the first game that occurs after a particular point in time; and play of the second game terminates either when (i) a timer that begins to countdown at the particular point in time decrements to zero, or (ii) the second prize pool decrements to zero based on a plurality of prizes that are awarded during play of the second game.

5. The computer-implemented method of claim 1, wherein a number of plays of the second game is determined based at least in part on a number of prizes that are available to win during play of the second game.

6. The computer-implemented method of claim 1, wherein an outcome of a play of the second game is independent of an outcome of a play of the first game.

7. A non-transitory computer-readable medium storing computer-executable instructions which, when executed by a processor, cause the processor to perform operations comprising:

receiving at least one request with a wager from a player to play a first game associated with a first prize pool;

facilitating play of the first game on at least one networked terminal based at least in part on receiving the at least one request from the player to play the first game;

directing a portion of said wager to a second prize pool;

initiating play of a second game associated with the second prize pool on the at least one networked terminal; and determining the player is eligible to play the second game based on an eligibility criteria, wherein the second game is initiated in response to the second prize pool reaching a predetermined amount and a number of plays of the second game is determined based at least in part on a total number of players that are eligible to play the second game at a pre-determined point in time.

8. The non-transitory computer-readable medium of claim 7, wherein the computer-executable instructions further causes the processor to perform selecting a start time associated with the second game.

9. The non-transitory computer-readable medium of claim 7, wherein the eligibility criteria is based at least in part on at least one of:
(a) submitting a first game play request by the player within a predefined first time period;
(b) an average bet amount associated with the first player exceeding a predefined minimum during a second period of time; or
(c) a minimum number of credits, points or money in an account associated with the first player.

10. The non-transitory computer-readable medium of claim 7, wherein the second game is played concurrently with play of the first game that occurs after a particular point in time; and play of the second game terminates either when (i) a timer that begins to countdown at the particular point in time decrements to zero, or (ii) the second prize pool decrements to zero based on a plurality of prizes that are awarded during play of the second game.

11. The non-transitory computer-readable medium of claim 7, wherein a number of plays of the second game is determined based at least in part on a number of prizes that are available to win during-play of the second game.

12. The non-transitory computer-readable medium of claim 7, wherein an outcome of a play of the second game is independent of an outcome of a play of the first game.

13. A system comprising:
at least one memory storing computer-executable instructions; and
at least one processor, wherein the at least one processor is configured to access the at least one memory and to execute the computer-executable instructions to:
receive at least one request with a wager from a player to play a first game associated with a first prize pool;
facilitate play of the first game on at least one networked terminal based at least in part on a receipt of the at least one request from the player to play the first game;
direct a portion of said wager to a second prize pool;
initiate play of a second game associated with the second prize pool on the at least one networked terminal; and
determine eligibility of the player to play the second game based on an eligibility criteria,
wherein the second game is initiated in response to the second prize pool reaching a predetermined amount and a number of plays of the second game is determined based at least in part on a total number of players that are eligible to play the second game at a pre-determined point in time.

14. The system of claim 13, wherein the at least one processor is further configured to execute the compute-executable instructions to: select a start time associated with the second game.

15. The system of claim 13, wherein the eligibility criteria is based at least in part on at least one of:
(a) submission of a first game play request by the player within a predefined first time period;
(b) an average bet amount associated with the player exceeding a predefined minimum during a second time period; or
(c) a minimum number of credits, points or money in an account associated with the first player.

16. The system of claim 13, wherein the second game is played concurrently with play of the first game that occurs after a particular point in time; and play of the second game terminates either when (i) a timer that begins to countdown at the particular point in time decrements to zero, or (ii) the second prize pool decrements to zero based on a plurality of prizes that are awarded during play of the second game.

17. The system of claim 13, wherein a number of plays of the second game is determined based at least in part on a number of prizes that are available to win during play of the second game.

18. The system of claim 13, wherein an outcome of a play of the second game is independent of an outcome of a play of the first game.

* * * * *